Jan. 7, 1969   D. H. MANOTAS ET AL   3,419,973

MATHEMATICAL TEACHING WHEEL

Filed May 1, 1967

*INVENTORS*
DAGMAR H. MANOTAS
AVELINO L. MANOTAS
BY
*Knox & Knox*

Jan. 7, 1969  D. H. MANOTAS ET AL  3,419,973
MATHEMATICAL TEACHING WHEEL
Filed May 1, 1967  Sheet 2 of 2

INVENTORS
DAGMAR H. MANOTAS
AVELINO L. MANOTAS
BY
Knox & Knox

United States Patent Office 3,419,973
Patented Jan. 7, 1969

3,419,973
MATHEMATICAL TEACHING WHEEL
Dagmar H. Manotas and Avelino L. Manotas, both of 3711 Jennings, San Diego, Calif. 92106
Filed May 1, 1967, Ser. No. 635,015
U.S. Cl. 35—31     4 Claims
Int. Cl. G09b 19/02

ABSTRACT OF THE DISCLOSURE

The teaching wheel has a number disc with an array of numbers, a problem disc carrying specific problems and having windows adjacent each problem through which individual numbers on said number disc are visible to become portions of the problem, the two discs being rotatably held between double panels of a selector disc, in which each panel has a presentation window through which each problem is visible individually, specific problems can be selected directly by readily visible indicating means and the answer to each problem selected appears directly in the presentation window on the opposite side; by a unique double sided arrangement, several distinct sets of problems are accommodated on a unit of reasonable size without compromising legibility.

Background of the invention

The present invention relates to teaching aids and specifically to a mathematical teaching wheel.

Many types of sliding and rotating devices have been developed in which a problem can be set up at one position and the answer read at another position. These range from elementary teaching aids to complex slide rule devices and are adaptable to mathematics, spelling, languages, conversion tables and the like. In the mathematics application in particular, the large number of combinations for even a simple series of problems requires considerable space, since the data must be aligned in a specific pattern to appear in the proper places. As a result, the apparatus is either large and cumbersome, or the characters are small and difficult to read. In some types only a single, small item is visible at a time and a specific item or problem can only be located by adjusting the device until that item is found.

Summary of the invention

The teaching wheel described herein has readily visible indicators or markers by which a specific problem can be selected instantly. Only the selected problem appears in a presentation window and the answer is automatically displayed on the other side, immediately behind the problem. By utilizing a novel double sided arrangement, several related but distinct sets of problems can be presented on a wheel unit of reasonable size, without undue crowding or confusion due to misalignment of non-related data.

Description of the preferred embodiments

Figure 1:
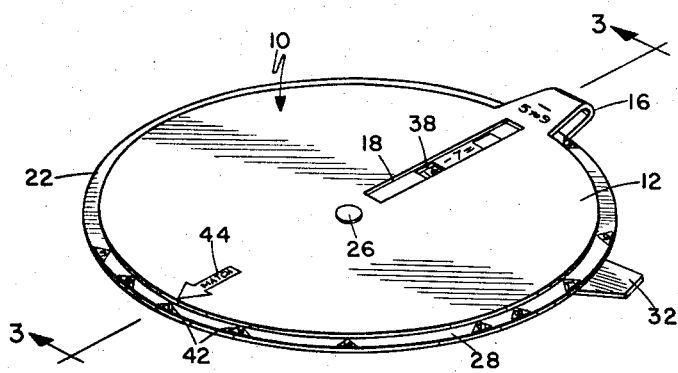
FIGURE 1 is a perspective view of one side of the teaching wheel.

The particular teaching wheel illustrated is merely one example of the application to elementary mathematical instruction, but shows fully the layout and operation. The problems could involve addition, subtraction, multiplication, or division, the differences being only in the numbers and accompanying data. In the example the numbers relate to subtraction, using numbers 5 to 9. In a typical equation, such as 12—5=7, any one of the three numerical elements can be the unknown to be found. Thus there are three basic sets of problems involved and the teaching wheel is shown in a three set arrangement with the five numbers 5, 6, 7, 8 and 9 appearing in sequence in each set. For other problems the arrangement might vary, but the basic principles would remain the same.

The assembly comprises a double layered selector disc 10 having a front panel 12 and a back panel 14, joined by a return folded radial extension which forms a handle 16. It should be understood that the terms front and back in the following description are used for convenience only, since the unit can be used from either side. In the front panel 12 is a radial slot forming a presentation window 18, which extends from the periphery, at handle 16, almost to the center of the panel. In back panel 14, in axial alignment with the outer portion of window 18, is a somewhat shorter radial slot forming a presentation window 20.

Between panels 12 and 14 of the selector disc are a problem disc 22 and a number disc 24, the assembly being held together by an axial pin 26 on which all three disc elements are rotatable relative to each other. Problem disc 22 is adjacent front panel 12 and is slightly larger in diameter than the selector disc to provide an extended rim 28 by which it can be gripped and turned. Number disc 24 is somewhat smaller in diameter than the selector disc 10 and fits between problem disc 22 and back panel 14, so that a peripheral portion 30 of the rear face of the problem disc extends beyond the edge of the number disc. To facilitate turning, the number disc 24 has an integral radial arm 32 projecting beyond the edge of the assembly.

On the front face 34 of number disc 24 are radially disposed sets of numbers. For the particular problems involved there are ten radial sets, equally spaced, with five numbers in each set at equal concentric spacings. Around the periphery of the rear face 36 of number disc 24 are the numbers 1 to 9 and zero, each aligned with the outer end of one of the radial sets of numbers on the other side. The specific sequence of the numbers can vary according to the layout of the problems, the arrangement shown being one which has been used in a working model.

Figure 4:
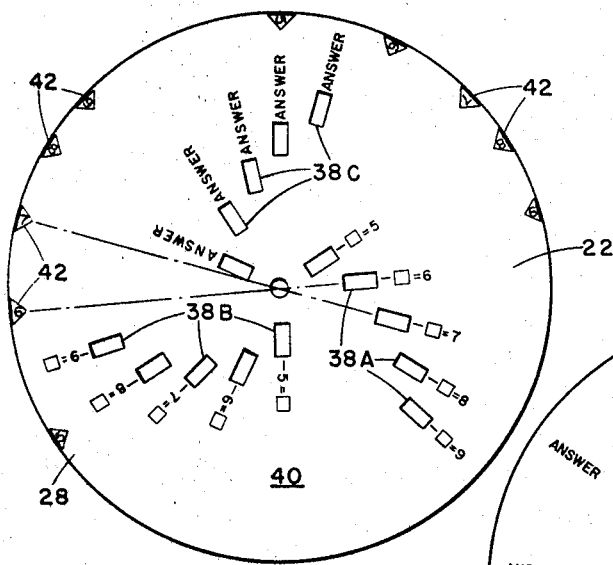
FIGURE 4 is a view of one side of the problem disc.
Figure 5:
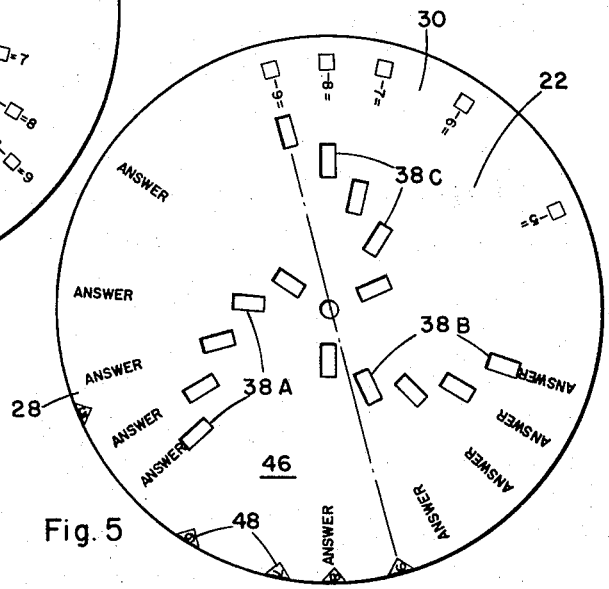
FIGURE 5 is a view of the other side of the problem disc.
Figure 6:
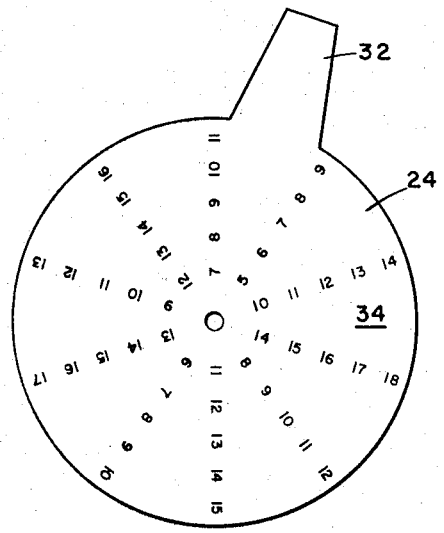
FIGURE 6 is a view of one side of the number disc.
Figure 7:
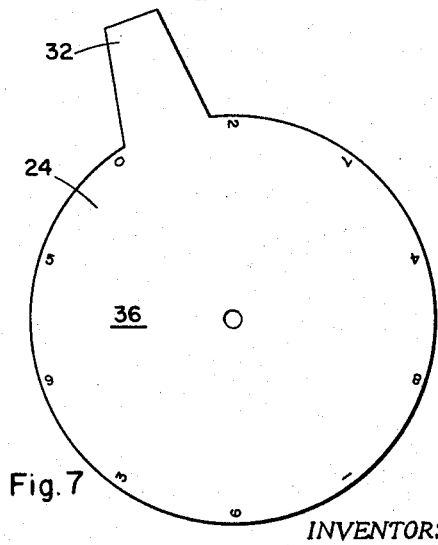
FIGURE 7 is a view of the other side of the number disc.
Similar characters of reference indicate similar or identical elements and portions throughout the specification and throughout the views of the drawings.

Problem disc 22 has a plurality of small openings forming number windows 38, which are arranged in three sets of five corresponding to the three sets of problems, the sets being identified as 38A, 38B and 38C for descriptive purposes. Each set of number windows is spirally stepped to provide space on the disc for the problem data and the windows are radially spaced to correspond to the spacing of the radial sets of numbers on number disc 24. On the front face 40 of problem disc 22 the windows in set 38A each has a portion of a problem printed alongside and extending radially outwardly, each problem including one of the key numbers 5 to 9. As shown the key number is the answer in this set. The windows in set 38B also have individual problems adjacent thereto with a key number from 5 to 9 in each, the key number in this set being the number to be subtracted. Adjacent each window in set 38C is printed the word ANSWER, the function of which is hereinafter explained. Presentation window 18 exposes a narrow strip of substantially the full radius of front face 40, so that each window 38 and its adjacent data can be exposed. To facilitate immediate selection of a specific problem without searching key markers 42 are placed on the rim 28 of the problem disc, each key marker containing a key number and being diametrically opposite the problem containing that key number, as indicated by the broken lines in FIGURE 4. On front panel 12, diametrically opposite presentation window 18, is a selection indicator 44, represented as an arrow, which, when aligned with one of the key markers 42, will expose the problem containing that key number. To indicate the type or set of problems the key markers 42 can be distinctly color coded, enabling any problem to be selected.

On the rear face 46 of problem disc 22 window set 38C has problems radially aligned with each window, while window sets 38A and 38B have the word ANSWER printed in radial alignment with each window. In this instance, however, the data is not immediately adjacent the respective windows, but is all carried on the peripheral portion 30 which is visible through presentation window 20. Diametrically opposite each window in set 38C, on the rim 28, is a key marker 48 corresponding to the key number in each problem of that set. On back panel 14, diametrically opposed to presentation window 20, is a selection indicator 50 for alignment selectively with key markers 48, which may be color coded differently from those on the other side of the problem disc.

Figure 2:
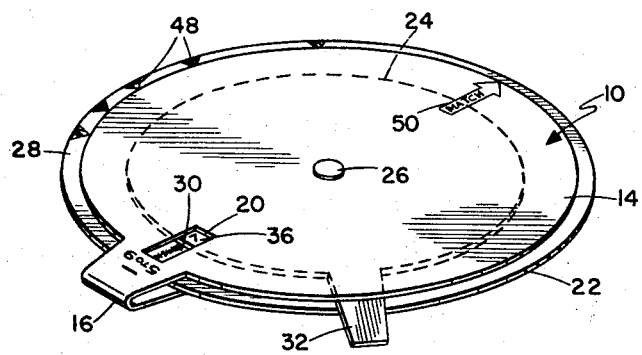
FIGURE 2 is a perspective view of the other side thereof.
Figure 3:
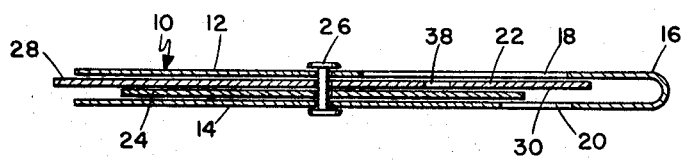
FIGURE 3 is a sectional view taken on line 3—3 of FIGURE 1.

The procedure for setting up a problem is very simple, a sample being shown in FIGURES 1 and 2. Working from the front side of the teaching wheel, problem disc 22 is turned to bring key marker 42 of a particular color and containing the number 7 into registration with selection indicator 44. This will bring the selected problem into view in presentation window 18, together with a number window 38. Number disc 24 is then turned to bring a specific number into view through window 38, the number 14 being indicated in the example. Key number 7 is subtracted from selected number 14 to obtain the answer, which is the unknown factor in this particular problem. When the teaching wheel is turned over the correct answer (7) on the number disc rear face 36, is exposed in presentation window 20, alongside the word ANSWER which appears on the peripheral portion 30 of the problem disc. This procedure applies to any problem in the sets at windows 38A and 38B.

To use the problems at windows 38C the teaching wheel is turned over and selection indicator 50 is aligned with the appropriate key marker 48. The selected problem will then apepar in presentation window 20 and number disc 24 is turned to bring a selected peripheral number into view, which will represent the solution to the problem in the particular layout shown. The answer to be determined is then the number from which the key number is subtracted to obtain the selected solution and this appears on the opposite side in representation window 18, alongside the word ANSWER on problem disc 22.

The double sided arrangement, using the presentation windows and number windows for both problems and answers depending on the selection, enables considerable data to be carried by the discs without crowding, which will be apparent from the drawings. Only the actual problems, numbers and answers which are correctly related can appear properly in the respective windows and there is no possibility of incorrect combinations due to misalignment. The teaching wheel is easy to use and is ideally suitable for use by beginning mathematics students.

It is understood that minor variation from the form of the invention disclosed herein may be made without departure from the spirit and scope of the invention, and that the specification and drawings are to be considered as merely illustrative rather than limiting.

We claim:
1. A mathemetical teaching wheel, comprising:
   a double panelled selector disc, a problem disc and a number disc, said problem disc and number disc being superimposed between the panels of said selector disc with axial pivot means interconnecting the discs in relatively rotatable relation;
   said number disc having radially disposed sets of numbers on one side and peripherally spaced numbers on the other side each in radial alignment with one of said sets of numbers;
   said problem disc having spirally spaced sets of number viewing windows each registrable with one number in each of said sets;
   each side of said problem disc having portions of problems thereon radially aligned with certain sets of said viewing windows, and answer indicating means radially aligned with the remaining viewing windows;
   said selector disc having a radially extending presentation window in each panel thereof;
   and the numbers on said number disc being so arranged that the answer to a problem visible in one of said presentation windows is displayed in the presentation window on the other side.
2. The structure of claim 1, wherein said problem disc is slightly larger than said selector disc and has an extended rim portion;
   said rim portion having markers thereon each diametrically opposed to one of said number windows and identifying the problem associated with that window;
   and said selector disc having selection indicator means thereon, diametrically opposed to said presentation windows, for selective alignment with said markers, whereby the selected problem appears in the related presentation window.
3. The structure of claim 2, wherein said markers are distinctively coded in sets to identify the associated sets of problems.
4. The structure of claim 1, wherein said number disc is substantially smaller than said problem disc and has an extended adjustment arm;
   one of said presentation windows exposing peripheral portions of said number disc and said problem disc, and the problems and answer indicating means on that side of the problem disc being in the exposed peripheral portion.

References Cited

UNITED STATES PATENTS

| | | | |
|---|---|---|---|
| 809,294 | 1/1906 | Fry | 235—88 |
| 1,681,740 | 8/1928 | Meyers | 40—70 |
| 2,906,037 | 9/1959 | Rubin | 35—31 |
| 2,908,439 | 10/1959 | Evans | 235—88 |

FOREIGN PATENTS 861,369   10/1940   France.

EUGENE R. CAPOZIO, *Primary Examiner.*

WILLIAM H. GRIEB, *Assistant Examiner.*

U.S. Cl. X.R.

35—74; 235—88